US012685986B2

(12) United States Patent  
Posselt et al.

(10) Patent No.: US 12,685,986 B2  
(45) Date of Patent: Jul. 21, 2026

(54) REACTOR AND METHOD FOR CARRYING OUT A CHEMICAL REACTION

(71) Applicants: LINDE GMBH, Pullach (DE); BASF SE, Ludwigshafen (DE)

(72) Inventors: Heinz Posselt, Bad Aibling (DE); Mathieu Zellhuber, Martinsried (DE); Martin Hofstätter, Munich (DE); Clara Delhomme-Neudecker, Munich (DE); Andrey Shustov, Ludwigshafen am Rhein (DE); Eric Jenne, Hassloch (DE); Kiara Aenne Kochendörfer, Mannheim (DE); Heinrich Laib, Limburgerhof (DE); Reiner Jacob, Hochspeyer (DE); Heinz-Jürgen Kühn, Westhofen (DE)

(73) Assignees: Linde GmbH, Pullach (DE); BASF SE, Ludwigshafen (DE)

( * ) Notice: Subject to any disclaimer, the term of this patent is extended or adjusted under 35 U.S.C. 154(b) by 761 days.

(21) Appl. No.: 17/906,171

(22) PCT Filed: Mar. 11, 2021

(86) PCT No.: PCT/EP2021/056226  
§ 371 (c)(1),  
(2) Date: Sep. 12, 2022

(87) PCT Pub. No.: WO2021/180864  
PCT Pub. Date: Sep. 16, 2021

(65) Prior Publication Data  
US 2023/0116690 A1 Apr. 13, 2023

(30) Foreign Application Priority Data  
Mar. 13, 2020 (EP) ..................................... 20163163

(51) Int. Cl.  
*B01J 19/00* (2006.01)  
*B01J 19/24* (2006.01)  
*C01B 3/34* (2006.01)

(52) U.S. Cl.  
CPC ....... *B01J 19/0013* (2013.01); *B01J 19/2425* (2013.01); *C01B 3/34* (2013.01);  
(Continued)

(58) Field of Classification Search  
CPC .. B01J 19/243; B01J 19/2425; B01J 19/0013; B01J 2219/00135; B01J 2219/00096  
See application file for complete search history.

(56) References Cited

U.S. PATENT DOCUMENTS 1,985,680 A 12/1934 Mapes  
5,000,926 A 3/1991 Murayama et al.  
(Continued)

FOREIGN PATENT DOCUMENTS

CN 1332226 A 1/2002  
CN 1774291 A 5/2006  
(Continued)

OTHER PUBLICATIONS

Translation of International Search Report dated Jun. 17, 2021, 3 pages, issued in PCT App. No. PCT/EP2021/056226.  
(Continued)

*Primary Examiner* — Lessanework Seifu  
(74) *Attorney, Agent, or Firm* — Avek IP, LLC

(57) ABSTRACT

A reactor for carrying out a chemical reaction, which has a reactor vessel and one or more reaction tubes, wherein power input elements for electrical heating of the reaction tube(s) are guided into the reactor vessel. It is provided that the power input elements each have a rod-shaped section that, in each case, runs at a wall passage through a wall of the reactor vessel in such a way that a connection chamber (Continued)

into which the rod-shaped sections project is arranged outside the reactor vessel and adjacently to the wall of the reactor vessel through which the rod-shaped sections run at their wall passages, and that cooling panels through which a cooling fluid can flow are provided in the connection chamber and are arranged between at least two or between at least two groups of the rod-shaped sections that project into the connection chamber.

19 Claims, 8 Drawing Sheets

(52) U.S. Cl.
CPC ................. *B01J 2219/00096* (2013.01); *B01J 2219/00135* (2013.01); *C01B 2203/0233* (2013.01); *C01B 2203/0238* (2013.01); *C01B 2203/085* (2013.01); *C01B 2203/0883* (2013.01)

(56) References Cited

U.S. PATENT DOCUMENTS

| | | | |
|---|---|---|---|
| 5,204,071 A | | 4/1993 | Carter et al. |
| 5,270,016 A | * | 12/1993 | Alagy .................... B01J 12/005 |
| | | | 422/198 |
| 6,191,332 B1 | | 2/2001 | Duee et al. |
| 6,296,814 B1 | | 10/2001 | Bonk et al. |
| 7,371,361 B2 | | 5/2008 | Singh et al. |
| 7,462,209 B2 | | 12/2008 | Berggren et al. |
| 7,667,072 B2 | | 2/2010 | Yada et al. |
| 7,846,417 B2 | | 12/2010 | Singh et al. |
| 9,347,596 B2 | | 5/2016 | Wortmann et al. |
| 9,908,091 B2 | | 3/2018 | Vogel et al. |
| 2004/0015012 A1 | | 1/2004 | Hammon et al. |
| 2006/0089519 A1 | | 4/2006 | Stell et al. |
| 2010/0105944 A1 | | 4/2010 | Buturla et al. |
| 2012/0241677 A1 | | 9/2012 | Perkins et al. |
| 2012/0328269 A1 | | 12/2012 | Ellinger et al. |
| 2014/0238523 A1 | | 8/2014 | Wortmann et al. |
| 2015/0010467 A1 | | 1/2015 | Ito et al. |
| 2015/0122802 A1 | | 5/2015 | Zikeli et al. |
| 2016/0288074 A1 | * | 10/2016 | Vogel ....................... B01J 8/067 |
| 2018/0208525 A1 | | 7/2018 | Schoonebeek et al. |
| 2019/0002389 A1 | | 1/2019 | Horstmann et al. |
| 2020/0299131 A1 | | 9/2020 | Finnerty et al. |
| 2021/0071007 A1 | | 3/2021 | Hardman et al. |
| 2021/0179948 A1 | | 6/2021 | Kochendoerfer et al. |
| 2023/0115461 A1 | | 4/2023 | Zellhuber et al. |
| 2023/0116690 A1 | | 4/2023 | Posselt et al. |
| 2023/0211305 A1 | | 7/2023 | Hofstätter et al. |
| 2023/0226511 A1 | | 7/2023 | Hofstätter et al. |
| 2023/0285929 A1 | | 9/2023 | Posselt et al. |
| 2023/0302426 A1 | | 9/2023 | Zellhuber et al. |
| 2023/0356176 A1 | | 11/2023 | Lang et al. |
| 2023/0398513 A1 | | 12/2023 | Hofstatter et al. |
| 2024/0100498 A1 | | 3/2024 | Hofstatter et al. |
| 2024/0123421 A1 | | 4/2024 | Zellhuber et al. |
| 2024/0207811 A1 | | 6/2024 | Zellhuber et al. |

FOREIGN PATENT DOCUMENTS

| | | |
|---|---|---|
| CN | 101124038 A | 2/2008 |
| CN | 101150894 A | 3/2008 |
| CN | 201565295 U | 9/2010 |
| CN | 104080527 A | 10/2014 |
| CN | 105307766 A | 2/2016 |
| CN | 208878600 U | 5/2019 |
| CN | 109923656 A | 6/2019 |
| CN | 11578710 A | 8/2020 |
| CN | 112368235 A | 2/2021 |
| DE | 2362628 A1 | 6/1975 |
| DE | 102006054156 A1 | 5/2008 |
| DE | 102011077970 A1 | 12/2012 |
| DE | 102015004121 A1 | 10/2016 |
| DE | 102018132736 A1 | 6/2020 |
| EP | 0399833 A1 | 11/1990 |
| EP | 0792683 A2 | 9/1997 |
| EP | 1043367 A1 | 10/2000 |
| EP | 1273552 A2 | 1/2003 |
| EP | 2805762 A1 | 11/2014 |
| EP | 3075704 A1 | 10/2016 |
| EP | 3153466 A1 | 4/2017 |
| EP | 3862076 A1 | 8/2021 |
| EP | 3900817 A1 | 10/2021 |
| EP | 4056892 A1 | 9/2022 |
| JP | S49010026 A | 1/1974 |
| JP | S5223246 A | 2/1977 |
| JP | S57144840 A | 9/1982 |
| JP | S6099951 A | 6/1985 |
| JP | S60191444 A | 9/1985 |
| JP | H05317843 A | 12/1993 |
| JP | H06104187 A | 4/1994 |
| JP | H1053775 A | 2/1998 |
| JP | H1094727 A | 4/1998 |
| JP | H11130541 A | 5/1999 |
| JP | 2006261362 A | 9/2006 |
| JP | 2008221093 A | 9/2008 |
| JP | 2009526734 A | 7/2009 |
| JP | 2010227901 A | 10/2010 |
| JP | 2011258392 A | 12/2011 |
| JP | 2013067537 A | 4/2013 |
| JP | 2016087512 A | 5/2016 |
| PL | 175410 B1 | 5/1995 |
| RU | 2173213 C1 | 9/2001 |
| WO | 1997015983 | 5/1997 |
| WO | 2004091773 A1 | 10/2004 |
| WO | 2006013926 A1 | 2/2006 |
| WO | 2014202501 A1 | 12/2014 |
| WO | 2015069762 A2 | 5/2015 |
| WO | 2015123578 A1 | 8/2015 |
| WO | 2015197181 A1 | 12/2015 |
| WO | 2017072057 A1 | 5/2017 |
| WO | 2019133215 A1 | 7/2019 |
| WO | 20190228798 A1 | 12/2019 |
| WO | 2020002326 A1 | 1/2020 |
| WO | 2020035575 A1 | 2/2020 |
| WO | 2022214622 A1 | 10/2022 |

OTHER PUBLICATIONS

Notice of Allowance issued Jun. 10, 2025 in corresponding Japanese Application No. JP20220555697, 1 page.

Notice of Opposition received in Application No. EP21719925.6, dated Jul. 25, 2024.

Substantive examination report with English description, dated Aug. 15, 2024, 10 pages, issued in Saudi Arabia Application No. 523450274.

Waitz and Wubben "Resistance heated furnaces for protective gas and vacuum operation" from Heat Processing (9), Issue 1, 2011, p. 29-38.

Office Action and Search Report issued Nov. 28, 2025 in Chinese Application No. 202180020711.3, 8 pages.

Badini, C. and Laurella, F., Oxidation of FeCrAl alloy: influence of temperature and atmosphere on scale growth rate and mechanism, Surface and Coatings Technology, 2001, vol. 135, Issues 2-3, 291-298.

Office Action issued Apr. 7, 2026 in JP Application No. 2023-547828, 5 pages.

Office Action issued Apr. 7, 2026 in JP Application No. 2023-561056, 3 pages.

* cited by examiner

300

13

12'

21

20

10

11'

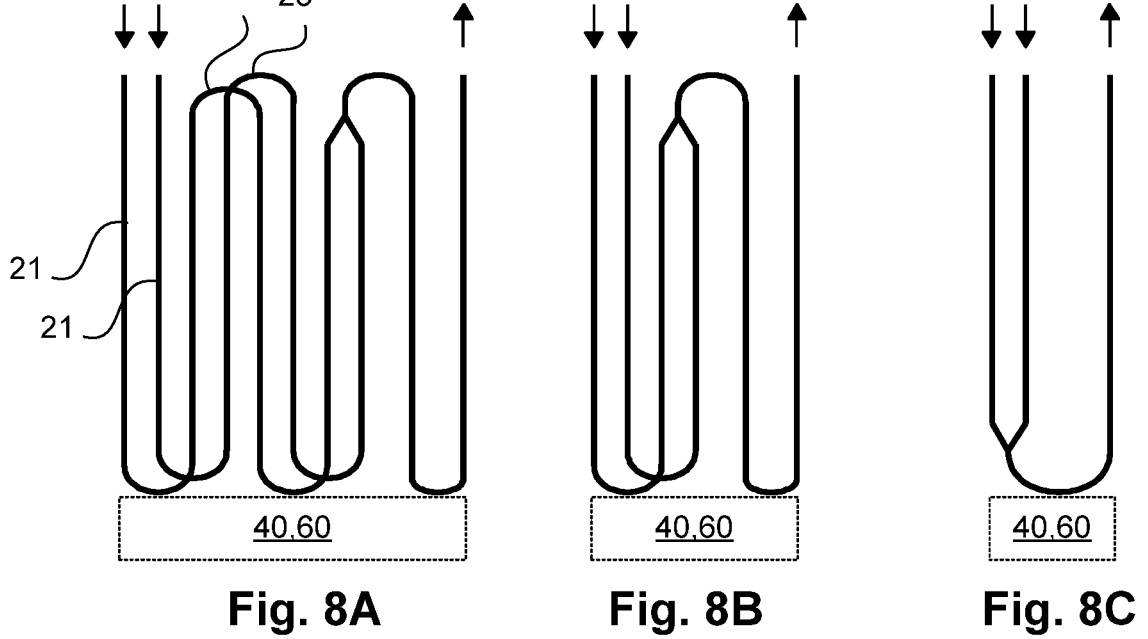
Fig. 8A          Fig. 8B          Fig. 8C

REACTOR AND METHOD FOR CARRYING OUT A CHEMICAL REACTION

CROSS REFERENCE TO RELATED APPLICATIONS

This application is the national phase of, and claims priority to, International Application No. PCT/EP2021/056226, filed Mar. 11, 2021, which claims priority to European Application No. 20163163.7, filed Mar. 13, 2020, the disclosure of each of which is incorporated by reference herein in its entirety.

FIELD OF THE INVENTION

The invention relates to a reactor and to a method for carrying out a chemical reaction.

BACKGROUND

In a number of processes in the chemical industry, reactors are used in which one or more reactants are passed through heated reaction tubes and catalytically or non-catalytically reacted there. The heating serves in particular to overcome the activation energy required for the chemical reaction that is taking place. The reaction can proceed as a whole endothermically or, after overcoming the activation energy, exothermically. The invention relates in particular to strongly endothermic reactions.

Examples of such processes are steam cracking, various reforming processes, in particular steam reforming, dry reforming (carbon dioxide reforming), mixed reforming processes, processes for dehydrogenating alkanes, and the like. In steam cracking, the reaction tubes are guided through the reactor in the form of coils, which have at least one U-bend in the reactor, whereas tubes running through the reactor without a U-bend are typically used in steam reforming.

The invention is suitable for all such processes and designs of reaction tubes. The articles "Ethylene", "Gas production", and "Propene" in Ullmann's Encyclopedia of Industrial Chemistry, for example the publications dated Apr. 15, 2009, DOI: 10.1002/14356007.a10_045.pub2, dated Dec. 15, 2006, DOI: 10.1002/14356007.a12_169.pub2, and dated Jun. 15, 2000, DOI: 10.1002/14356007.a22_211, are referred to here for purely illustrative purposes.

The reaction tubes of corresponding reactors are conventionally heated using burners. In this case, the reaction tubes are routed through a combustion chamber in which the burners are also arranged.

However, as described, for example, in DE 10 2015 004 121 A1 (likewise EP 3 075 704 A1), the demand for synthesis gas and hydrogen which are produced with or without reduced local carbon dioxide emissions is, for example, currently increasing. However, this demand cannot be met by processes in which fired reactors are used due to the combustion of typically fossil energy carriers. Other processes are ruled out, for example, due to high costs. The same also applies to the provision of olefins and/or other hydrocarbons by steam cracking or the dehydrogenation of alkanes. In such cases, too, there is a desire for processes that at least on site emit lower amounts of carbon dioxide.

Against this background, the aforementioned DE 10 2015 004 121 A1 proposes an electrical heating of a reactor for steam reforming in addition to a firing. In this case, one or more voltage sources are used which provide a three-phase alternating voltage on three external conductors. Each external conductor is connected to a reaction tube. A star circuit is formed in which a star point is realized by a collector into which the pipelines open and to which the reaction tubes are conductively connected. In this way, the collector ideally remains potential-free. In relation to the vertical, the collector is arranged below and outside the combustion chamber and preferably extends transversely to the reactor tubes or along the horizontal. WO 2015/197181 A1 likewise discloses a reactor whose reaction tubes are arranged in a star-point circuit.

In addition to the direct heating of reaction tubes, with which a current flows through the reaction tubes, there is also a wide variety of concepts for the indirect electrical heating of reaction tubes. Indirect electrical heating can take place, as described inter alia in WO 2020/002326 A1, in the form of external electrical heating. Internal heating is also possible, as disclosed in WO 2019/228798 A1, for example. In addition to resistance or impedance heating, inductive electrical heating of reaction tubes or a catalyst bed, as described in WO 2017/072057 A1, for example, can take place. Inductive heating can, for example, heat an internal or external heating element or the reaction tubes themselves. Direct (non-inductive) heating of a reaction tube is also disclosed in DE 10 2015 004 121 A1. For heating, basic concepts with polyphase or single-phase alternating current or with direct current can be realized. In the case of direct heating of reactors by means of direct current or also with single-phase alternating current, no star circuit with a potential-free star point can be realized, but the power input can basically be realized in a similar manner. The invention is suitable for all variants of electrical heating.

DE 23 62 628 A1 discloses a tube furnace for the thermal treatment of liquid or gaseous media in metal tubes that can be heated by means of resistance heating, wherein the tubes to be heated by means of resistance heating are conductively connected at the ends of the sections to be heated to power supply lines via electrical connections.

US 2014/0238523 A1 relates to a device for heating a pipeline system for a molten salt, comprising at least two pipelines along which an electrical resistance heating element extends in each case, wherein a potential close to the ground potential is set at each electrical resistance heating element at at least one end, and the electrical resistance heating element is connected remotely therefrom to a connection of a direct current source or in each case to a phase of an n-phase alternating current source.

A device for heating a fluid disclosed in WO 2020/035575 A1 comprises at least one electrically conductive pipeline and/or at least one electrically conductive pipeline segment for receiving the fluid and at least one direct current source and/or DC voltage source, wherein each pipeline and/or each pipeline segment is assigned a respective direct current source or DC voltage source, which is connected to the respective pipeline and/or to the respective pipeline segment, wherein the respective direct current source and/or DC voltage source is designed to generate an electrical current in the respective pipeline and/or in the respective pipeline segment, wherein the respective pipeline and/or the respective pipeline segment is heated by Joule heat, which is produced when the electrical current passes through conductive pipe material, in order to heat the fluid, wherein the device has a plurality of pipelines and/or pipeline segments, wherein the pipelines and/or pipeline segments are connected to one another and thus form a pipe system for receiving the fluid.

A fixed-bed reactor known from EP 2 805 762 A1 has an inflow path for raw gas for a catalytic reaction and an outflow path for reformed gas, a catalytic reaction vessel that is connected to the inflow path and the outflow path and contains a catalyst, catalyst holders that have a ventilation property and hold the catalyst, and a drive mechanism that moves the catalyst up and down by moving the catalyst holders up and down.

WO 2004/091773 A1 discloses an electrically heated reactor for carrying out gas reactions at high temperature. The reactor consists of a reactor block, of one or more monolithic modules of a material suitable for electrical heating, which modules are surrounded by a housing, of channels that extend through the module(s) and are designed as reaction channels, and of a device for conducting or inducing a current in the reactor block. The safety during operation of such a reactor is to be increased in that the housing of the reactor block comprises a double-walled jacket, which seals said reactor block in a gas-tight manner, and at least one device for feeding an inert gas into the double-walled jacket.

In particular, the power input in such electrically heated reactors has proven to be challenging due to the high current flows and temperatures. The object of the invention is therefore to improve corresponding, electrically heated reactors for carrying out chemical reactions.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

A reactor for carrying out a chemical reaction, the reactor comprising a reactor vessel and one or more reaction tubes; wherein: power input elements for electrical heating of the reaction tube(s) (20) are guided into the reactor vessel; the power input elements each have a rod-shaped section that runs through a wall of the reactor vessel at a respective wall passage; a connection chamber into which the rod-shaped sections project, is located outside the reactor vessel and adjacently to the wall of the reactor vessel in which the wall passages are formed; and cooling panels through which a cooling fluid can flow are provided in the connection chamber and are arranged between at least two or between at least two groups of the rod-shaped sections that project into the connection chamber.

BRIEF DESCRIPTION OF THE DRAWINGS

FIGS. 8A to 8C illustrate further reaction tubes for use in a reactor according to a development of the invention.

WRITTEN DESCRIPTION

Figure 1:
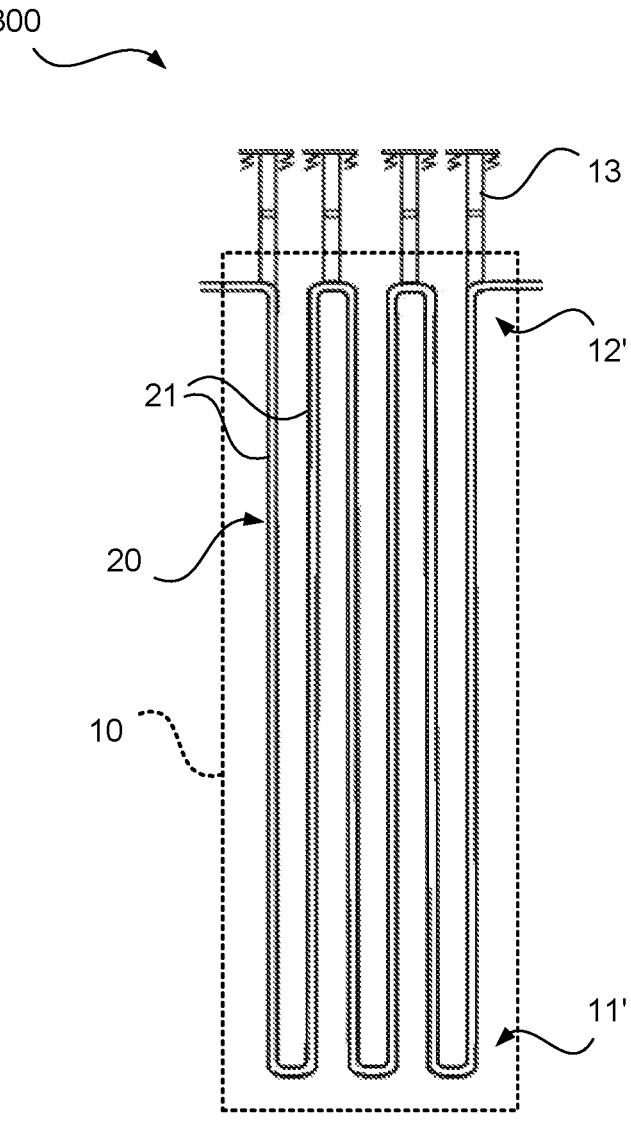
FIG. 1 schematically illustrates a reactor for carrying out a chemical reaction according to a non-inventive development.

Against this background, the invention proposes a reactor and a method for carrying out a chemical reaction.

In the usually partially electrified furnace concept (the term "furnace" is commonly understood to denote a corresponding reactor or at least its thermally insulated reaction space) that is the basis of the invention, reaction tubes, for example, or corresponding tube sections thereof (hereinafter also referred to for short as "tubes") are themselves used as electrical resistors in order to generate heat. This approach has the advantage of a greater efficiency compared to indirect heating by external electric heating elements as well as a higher attainable heat flux density. However, as mentioned at the outset, it is also possible to carry out any other type of electrical heating (directly or indirectly, in the form of resistance, impedance or induction heating, by means of a single-phase or polyphase alternating current or with direct current) within the scope of the invention, if said heating proves to be advantageous. Within the scope of the invention, the possibility is included of also providing a part of the entire heating power spent in the furnace, via firing of chemical energy carriers.

If, therefore, electrical heating is mentioned here, it does not preclude the presence of additional non-electrical heating. In particular, it can also be provided that the contributions of electrical and non-electrical heating are varied over time, e.g., as a function of the supply and price of electricity or the supply and price of non-electrical energy carriers, such as natural gas.

In the case of heating with polyphase alternating current, the current is fed into the directly heated reaction tubes via M separately connected phases. The current-conducting reaction tubes connected to the M phases may also be electrically connected to a star point. The number of phases M is in particular 3, corresponding to the number of phases of conventional three-phase current sources or networks. In principle, however, the invention is not restricted to the use of three phases but can also be used with a larger number of phases, e.g., a number of phases of 4, 5, 6, 7 or 8. A phase offset is in particular 360°/M, i.e., 120° in the case of a three-phase alternating current.

In electrical heating with polyphase alternating current, potential equalization between the phases is achieved by the star circuit at the star point, which makes electrical insulation of the connected pipelines superfluous. This represents a particular advantage of such a furnace concept, since a break in the metallic reaction tubes for insulating certain sections is undesirable, in particular because of the high temperatures used and the high material and construction outlay thus required.

However, the measures proposed according to the invention and explained below are suitable in the same way for the use of single-phase alternating current and direct current, and the invention can be used both in reactors heated with alternating current and in reactors heated with direct current or also in corresponding mixed forms. As mentioned, the invention is also suitable for use in indirectly heated reaction tubes. In comparison to an alternating current arrangement, for example, only the type of the current source and a region of the reaction tubes opposite the power input or corresponding energized sections are different in a direct current arrangement. In the latter, an electrical connection of different tube sections is only optionally carried out. Since a potential-free star point is not present in a direct current arrangement, suitable current discharge elements are to be provided, which safely conduct the current flow back to the outside. The latter can be designed analogously to the power inputs described below. A connection chamber as described below can be present in the upper region but may also be omitted, since the mobility requirement is eliminated.

In the terminology of the claims, the invention relates to a reactor for carrying out a chemical reaction, which has a reactor vessel (i.e., a thermally insulated or at least partially insulated region) and one or more reaction tubes, wherein power input elements for electrical heating of the reaction tube(s) are guided into the reactor vessel. According to the invention, the power input elements each have a rod-shaped section, wherein the rod-shaped sections each run at a wall passage through a wall of the reactor vessel.

The first region can in particular be located at a first terminal end of the straight tube sections, and the second region can be located at a second terminal end that is opposite the first terminal end. In particular, the first region can be located in an upper region of the reactor, and the second region can be located in a lower region of the reactor, or vice versa. In other words, the first region and the second region are located in particular at opposite ends of the reactor vessel or the interior space thereof, wherein the interior space of the reactor vessel between the first and the second region corresponds in particular to the intermediate region. The first region can, for example, represent or comprise the terminal 5%, 10% or 20% of the interior space at one end of the reactor vessel, whereas the second region represents or comprises the terminal 5%, 10% or 20% at the other, opposite end of the interior space of the reactor vessel. During operation of the reactor in particular, the first region is arranged at the bottom and the second region is arranged at the top.

Within the scope of the invention, a connection chamber into which the rod-shaped sections project is arranged outside the reactor vessel and adjacently to the wall through which the rod-shaped sections of the current input element(s) run, i.e., in which the wall passage(s) is or are formed. Depending on the type of power input, the connection chamber can be arranged below or laterally of the reactor vessel, so that the wall can be a bottom wall or side wall.

The rod-shaped sections are connected in the connection chamber to flexible contact elements, in particular, for example to strands, power strips, lamellar strips or current springs, for example also via suitable intermediate sections or intermediate elements. These flexible contact elements are fastened with an end, which is not connected to the rod-shaped sections, to rigid contact elements, which are typically arranged immovably in the connection chamber, for example in a manner insulated in a wall, and are supplied, for example, by a DC or AC transformer. The flexible contact elements in particular compensate for the longitudinal movement of the rod-shaped sections in the wall passages.

According to the invention, cooling panels through which a cooling fluid can flow are provided in the connection chamber and are arranged between at least two or between at least two groups of the rod-shaped sections that project into the connection chamber.

The invention is further described below with reference to developments in which a number of tube sections of the one or more reaction tubes run in each case between a first region and a second region within the reactor vessel and through an intermediate region between the first and the second region, and wherein the tube sections in the first region for electrical heating of the tube sections are each electrically connected or connectable to one or more power connections of a power source, namely in the case of a direct current arrangement to one or more direct current connections and in the case of a single-phase or polyphase alternating current arrangement to the phase connection or the phase connections ("outer conductors") of the alternating current source, as explained in detail below. In alternatively likewise possible indirect heating, which can also be used as mentioned, connecting elements for corresponding heating devices are guided through the wall of the reactor vessel.

As mentioned, in a corresponding development of the invention, a respective alternating voltage is in this case provided by means of a polyphase alternating current arrangement via the phase connections, and the alternating voltages of the phase connections are phase-shifted in the manner explained above. For example, a supply network or a suitable generator and/or transformer can serve as a polyphase alternating current source. The tube sections in this arrangement in particular form a star circuit in which they are electrically conductively coupled to one another at their respective opposite end to the power input, i.e., in the second region.

In the case of a direct current arrangement, on the other hand, in other developments, the same or different static electrical potentials are fed via one or more direct current connections and, in particular, current withdrawal elements are provided at the respective end opposite the power input. The same applies in a comparable manner when using a single-phase alternating current from one or more current sources.

In the intermediate region, the tube sections in the mentioned development of the invention through the reactor vessel in particular freely, i.e., without mechanical support, without electrical contacting, and/or without fluidic or purely mechanical cross-connections to one another. In this development, they in particular run substantially or entirely straight in the intermediate region, wherein "substantially straight" is to be understood as meaning that an angular deviation of less than 10° or 5° is present.

The cleavage reactions in steam cracking in particular are strongly endothermic reactions. For the provision of the necessary energy for the reaction by means of direct heating (ohmic resistance), high current intensities are therefore required, which are provided in the aforementioned reactor concept by one or more transformers placed outside the reactor.

In all the aforementioned concepts of electrical heating, the electrical current must be conducted with the lowest possible losses (low electrical resistance) from the outside into the interior of the thermally insulated reactor and to the process-conducting regions. In the latter, the endothermic reaction together with the very fast flowing process medium on the tube inner side (high heat transfer) leads to very effective cooling of the reactor tubes or a very high heat flow density on the tube inner side. The desired direct heat transfer from the at least partially electrically heated tube material to the process gas is thus achieved in the process-conducting tubes.

A particular problem relates to the above-mentioned low-loss supply of the high-voltage current to the process-conducting tubes. Provided that a current is to be fed into the tubes within the reactor, this supply must necessarily take place via lines that cannot be cooled by direct convective heat transfer to a cooler process gas, as also explained below. In this case, there must not be an unacceptable increase in temperature in the less efficiently cooled regions. In addition, a steep rise in temperature of up to 900 K (max. temperature difference between environment and reactor) within short path lengths (partially less than 1 meter) must also be overcome via this supply.

In order to reduce the thermal losses and thus to achieve a high system efficiency, it is imperative to place the electrically directly heated reaction tubes in an insulated box (referred to here as the reactor vessel). When penetrating the thermally insulated wall of the reactor vessel, the current conductor must overcome a quasi-adiabatic zone without impermissibly high local temperatures occurring in these regions.

Therefore, within the scope of the particularly preferred development of the invention just explained, in order to achieve this goal, power input arrangements to which a respective tube section or a respective group of the tube sections is electrically connected are provided in the first region of the reactor, i.e., in the region of the power input. The tube sections are provided in such a number that a respective one or a respective group of a plurality of tube sections can be connected to a respective one of the power input arrangements, and vice versa. The number of power input arrangements provided within the scope of the invention depends on the number of phase connections of the polyphase alternating current source in the case of an alternating current arrangement or this number corresponds to the number of direct current connections. When an alternating current arrangement is used, it can be the same as the number of phase connections or can be an integer multiple thereof. In the latter case, two of the power input arrangements can, for example, in each case be connected to a respective one of the phase connections of the alternating current source, etc.

The power input arrangements in this case each comprise one or more contact passages, which adjoins or adjoin at least a respective one of the tube sections in the first region and which run through the power input arrangements. The one or more contact passages in the power input arrangements can, as described in more detail below, in each case run straight or in the form of a U-bend through the power input arrangements. They are then in particular designed as a wall-reinforced bend. Reaction tubes without U-bends are in particular wall-reinforced sleeves.

The one or more contact passages in the power input arrangements can be designed either in one or more components, which is or are attached to the tube sections and is or are firmly bonded to the tube sections in a high-temperature-resistant manner, or alternatively in the form of a continuous section or a respective continuous section of the reaction tubes. In all developments, a design with as few components as possible typically proves to be advantageous, as also explained below.

In the former case, the tube sections that run between the first and the second region in the reactor can be welded to a prefabricated component in which one or more of the contact passages runs or run, or a corresponding further component can be cast onto the tube sections that run between the first and the second region in the reactor. In the latter case, continuous tubes, which are to form, on the one hand, the tube sections that run between the first and the second region in the reactor and, on the other hand, the contact passages in the respective power input arrangements, can be provided, and further components of the power input arrangements can be provided by means of casting-on or casting-around or welding.

When it is mentioned above and below that the power input arrangements comprise one or more contact passages "which adjoins or adjoin at least a respective one of the tube sections in the first region", it is understood that this means that the contact passages in the power input arrangements together with the respective tube sections between the first and the second region form a continuous channel for the process fluid to be conducted through the tube sections.

In particular, a tube interior space of the respective tube sections between the first and the second region continues in this case into the corresponding contact passages, in particular without a considerable tapering or widening, wherein a "considerable" tapering or widening is to denote a tapering or widening by more than 10% of the cross-sectional area. The term "contact passages" is used to refer to regions in which a conductive connection via metal components to a power connection exists, even if, in certain developments of the invention, the "contact passages" are continuous continuations of the tube sections in the first region.

The term "firmly bonded in a high-temperature-resistant manner" is to denote a connection type by means of which two or more metal parts are firmly bonded to one another and the connection is permanent at 500° C. to 1,500° C., in particular 600° C. to 1,200° C. or 800° C. to 1,000° C., i.e., it does not become detached during regular operation at such temperatures. A high-temperature-resistant, firmly bonded connection can in particular be designed as a metal-to-metal connection, which is established in such a way that no non-metal material remains between the connected parts. Such a connection can be produced in particular by welding, casting-on or casting-around. It can also be a connection with which no structural difference is observed at the transition of the connected parts and in particular a connection with which no additional metal is used for the connection.

In the development of the invention just explained, the walls of the contact passages of the power input arrangements are each connected to one of the power input elements, each of which has, as described above, at least one rod-shaped section which runs in each case at a wall passage through a wall of the reactor vessel. In contrast to strands or the like, for example, the rod-shaped section in all developments of the invention is in particular formed in one piece (i.e., in particular not in the form of parallel or braided wires) from a current-conducting material, such as metal. It can be designed to be solid or at least partially tubular, i.e., as a hollow rod. The rod-shaped section has a longitudinal extension that is perpendicular to the wall of the reactor vessel and at least twice as large, in particular at least three times, four times or five times and, for example, up to ten times as large as a largest transverse extension parallel to the wall of the reactor vessel. The rod-shaped section can, for example, be round, oval, or triangular or polygonal in cross-section or have any other shape.

The power input elements of the power input arrangements can be attached with each of their rod-shaped sections directly to the wall of the contact passages or can transition into them as a result of being manufactured in one piece. However, one or more intermediate elements can also be provided, which then each form a part of the power input elements.

The cooling panels provided in the connection chamber provided according to the invention are designed to be flat at least in one section, i.e., they extend between two imaginary or real boundary surfaces arranged at a distance from one another, wherein the distance of the boundary surfaces defines a thickness of the cooling panels and an extension along the boundary surfaces is more than twice, five times, ten times or twenty times greater than the thickness. The boundary surfaces can be planar or curved boundary surfaces so that the cooling panels can be flat and planar, but they can also be curved so that the cooling panels in this case can be flat and semi-cylindrically or partially cylindrically curved. Different cooling panels can also be dimensioned or designed differently. The "boundary surfaces" are surfaces that define the maximum thickness of the cooling panels. The cooling panels do not have to rest against these boundary surfaces over the entire surface.

These dimensions apply individually to each of the cooling panels, i.e., a first cooling panel can be arranged obliquely or perpendicularly to a second cooling panel. A plurality of cooling panels can be rotated relative to one another in particular about an axis that is parallel to the longitudinal extension direction of the rod-shaped sections of the power input elements and perpendicular to the wall of the reactor vessel.

The cooling panels can in particular be configured for the cooling fluid to flow through in a direction that corresponds overall to a direction perpendicular or parallel to the rod-shaped sections, for example through corresponding feed and removal openings for the cooling fluid on sides that are parallel to the rod-shaped sections.

The thickness of the cooling panels can be in the range of 0.5 cm to 10 cm, in particular of 1 cm to 5 cm, at least in the section dimensioned as mentioned.

In particular, the connection chamber can have side walls that extend perpendicularly to the wall of the reactor vessel through which the rod-shaped sections of the power input elements run at the wall passages in each case. One or more further cooling panels can be arranged on or in parallel to at least one of the side walls. Like the previously mentioned cooling panels, these cooling panels can be designed with basic dimensioning.

In particular, the connection chamber can also have a parallel wall, which extends in parallel to the wall of the reactor vessel through which the rod-shaped sections of the power input elements run in each case at the wall passages, i.e., for example, the bottom wall or side wall, wherein the previously described elements are arranged between the mentioned wall of the reactor vessel and the parallel wall of the connection chamber. The parallel wall can be designed at least partially as a hollow wall and be configured for the mentioned or a further cooling fluid to flow through.

It is particularly advantageous within the scope of the invention if a connection chamber without devices for providing forced convection in a gas atmosphere surrounding the cooling panels, such as blowers, fans, and the like, is used. In accordance with the understanding among experts, a forced convection is understood here to mean a convection caused by external mechanical action on a fluid.

A corresponding mechanical action produces pressure differences which cause the fluid to flow.

When using forced cooling of the rod-shaped sections of the power input elements in the gas chamber, which is therefore predominant or radiative (except for natural convection), there is the possibility of designing the cooling chamber with the cooling panels to be gas-tight to the outside but gas-permeable with respect to the reactor vessel (in particular via the wall passages). A particularly preferred development of the invention therefore comprises this feature. An oxygen-poor atmosphere, for example, can thus be applied to the interior of the reactor vessel including the cooling chamber because no gas exchange, as would be required in the case of forced convection, is necessary.

The invention enables the rod-shaped sections of the power input elements to be movably received in the wall of the reactor vessel without requiring a gas-tight seal, as would otherwise be necessary in order to avoid escape of combustible gases into the environment, for example when the reaction tubes are damaged ("coil shredder"). Within the scope of the invention, the wall passages can therefore be significantly more compact and be permanent because sealing materials are dispensed with. It is advantageous here that all components exiting from the cooling chamber to the environment now have very small compensation movements, so that the implementation of gas tightness with respect to the reactor vessel wall itself is significantly simplified here.

In the invention, the described cooling, in addition to the corresponding dimensioning and design of the power input elements themselves, ensures that sufficiently low temperatures, in particular for connecting highly conductive and/or flexible contact elements, are maintained overall. The active cooling, proposed within the scope of the invention, outside the thermally insulated reactor vessel affects the temperature distribution in the outer part (i.e., the part projecting into the connection chamber) of the rod-shaped sections of the power input elements. The cooling panels provided in the connection chamber within the scope of the invention, which panels can also be understood as cooled intermediate walls, ensure increased heat dissipation from the rod-shaped sections.

By using the invention, the use of material in the design of the power input elements or of the rod-shaped sections thereof can be reduced. In the case of purely passive cooling, only very low heat development rates in the rod-shaped sections could be permitted in order to avoid overheating in the event of a permanent load. An increased use of material required for this purpose is undesirable with regard to the costs and the mechanical load on the system.

Within the scope of the invention, sufficiently low temperatures are achieved in a connection region of the rod-shaped sections, so that, for example, very conductive but temperature-sensitive copper-containing connecting elements can be connected. The use of very conductive connecting elements minimizes the electrical losses in the feed lines. In addition, these connecting elements can be designed flexibly at a sufficiently low temperature in order to in this way absorb the thermal expansion of the sections of the reaction tubes during operation, which expansion transmits to the rod-shaped sections of the power input elements.

In a particularly advantageous development of the invention, the rod-shaped sections of the power input elements in the connection chamber are therefore designed with contact elements of a corresponding type, i.e., contact elements that have a material of a higher conductivity than the material of the rod-shaped sections. Alternatively or additionally, these contact elements can be flexible contact elements, such as strands, power strips, lamellar strips or current springs, as mentioned. In this development, these flexible contact elements are fastened with an end not connected to the rod-shaped sections, as mentioned, to rigid contact elements arranged immovably in the connection chamber. The rigid contact elements can be fastened in particular in the mentioned parallel wall and/or run through this parallel wall.

Since the electrical conductor resistance of many metal materials increases with increasing temperature, the thermal power loss can be reduced by the reduction, resulting from the forced cooling within the scope of the invention, of the average temperature in the rod-shaped sections of the power input elements, but also in flexible strand elements connected thereto, for example, and the efficiency of the system can thus be increased.

Due to its very low electrical conductivity, demineralized or fully desalinized water, for example with a conductivity of less than 10 μS/cm, in particular less than 5, 1, 0.5 or 0.1 μS/cm, at 25° C., is advantageously used within the scope of the invention as the cooling fluid. The placement of the cooling panels also takes place in particular with regard to sufficient protection against short circuits (in particular by maintaining minimum distances).

According to a particularly preferred development of the invention, the cooling panels can be formed from parallel metal sheets that are connected to one another by laser or roll welding and are inflated in a cushion-like manner.

Particularly advantageously, the rod-shaped sections projecting into the cooling chamber have, at least at one point, a respective cross-section which is not less than 10 square centimeters, advantageously not less than 30 square centimeters, and in particular not less than 50 square centimeters. By using correspondingly high cross-sections, a particularly low component temperature can be ensured.

Advantageously, as mentioned, the rod-shaped sections of the power input elements are each guided longitudinally movably in their wall passages through the wall of the reactor vessel. A freedom of movement ensured in this way is particularly advantageous for the mechanical behavior of the reaction tubes, which is dominated primarily by the thermal expansion of the tubes by several decimeters during operation of the reactor. Due to the freedom of movement, the bending load on the reaction tubes that would occur with a rigid fastening is reduced. On the other hand, as also mentioned below, the reaction tubes can be fastened with a rigid star bridge to the reactor roof in the second region in the case of alternating current heating, so that a stable suspension is given in this way even in the case of a corresponding longitudinal mobility of the rod-shaped sections of the power input elements. Due to their advantageous dimensioning with a sufficiently high line cross-section, the rod-shaped sections of the power input elements ensure the secure lateral guidance of the reaction tubes. On the other hand, as mentioned, by means of the connection in the cooling chamber, in particular via flexible contact elements, the components exiting from the cooling chamber to the environment now have very small compensation movements.

Since the reactions carried out in the reactor according to the invention require high temperatures, the electrical connection in the first region must be realized in a high-temperature range of, for example, approximately 900° C. for steam cracking. This is possible through the measures proposed according to the invention through the selection of suitable materials and their sufficient dimensioning. At the same time, the connection is intended to have a high electrical conductivity and high mechanical stability and reliability at high temperatures. In the case of the use of alternating current heating and a star-point connection, a failure of the electrical connection leads to asymmetrical potentials at the star point and consequently to the immediate safety-related shutdown of the system in response to undesired current conduction of system parts. The invention provides advantages over the prior art by avoiding such situations.

In comparison to a theoretically likewise possible contacting outside the reactor vessel for which the reaction tubes would have to be led out of the reactor vessel, the contacting provided according to the invention of the tube sections within the reactor vessel has the advantage of a clear defined path of the electrical heat input, because in this case no electrically heated tube sections have to be guided from the warmer interior space to the colder outer space. Through the contacting according to the invention, spatially very homogeneous external thermal boundary conditions of the electrically heated tube sections can be achieved due to the tube sections being arranged completely within the reactor vessel. This results in process engineering advantages, for example, an expected excessive coke formation in heated and externally thermally insulated passages can be avoided.

Within the scope of the invention, the power input elements, the contact passages and the tube sections can be formed from the same material or from materials whose electrical conductivities (in the sense of a material constant, as is customary among experts) differ by no more than 50%, no more than 30%, no more than 10%, from one another or are advantageously the same. For example, the components mentioned can also be formed from steels of the same steel class. The use of the same or closely related materials can simplify casting or welding. On the other hand, the contact elements connected in the cooling chamber can be formed from other material, which can be less temperature-resistant.

In a preferred embodiment, the power input elements, the contact passages and the tube sections have or are formed from a heat-resistant chromium-nickel-steel alloy with high oxidation or scale resistance and high carburization resistance.

For example, it can be an iron-containing metal with 0.1 to 0.5 wt. % carbon, 20 to 50 wt. % chromium, 20 to 80 wt. % nickel, 0 to 2 wt. % niobium, 0 to 3 wt. % silicon, 0 to 5% tungsten, and 0 to 1 wt. % other components, wherein the contents in each case add up to the non-iron percentage.

For example, materials with the standard designations GX40CrNiSi25-20, GX40NiCrSiNb35-25, GX45NiCrSiNbTi35-25, GX35CrNi SiNb24-24, GX45NiCrSi35-25, GX43NiCrWSi35-25-4, GX10NiCrNb32-20, GX50CrNiSi30-30, G-NiCr28W, G-NiCrCoW, GX45NiCrSiNb45-35, GX13NiCrNb45-35, GX13NiCrNb37-25, or GX55NiCrWZr33-30-04 according to DIN EN 10027, Part 1, "Materials", may be used. These have proven to be particularly suitable for high-temperature use.

In all of the cases explained above, the connecting element and the tube sections can be formed from the same material or from materials whose electrical conductivities (in the sense of a material constant, as is customary in the field) differ by no more than 50%, no more than 30%, no more than 10%, or are advantageously the same. For example, the connecting element and the tube sections can also be formed from steels of the same steel class. The use of identical or closely related materials can facilitate the one-piece design of the connecting element and of the tube sections, for example by means of casting or welding.

In the second region, all tube sections within the reactor vessel can be electrically conductively connected to one another by means of a rigid connecting element ("star bridge") in the case of heating by means of alternating current, or this connection can take place in groups by means of a plurality of rigid connecting elements.

In this case, i.e., in the case of heating by means of alternating current, the electrically conductive connection is carried out in such a way that an at least extensive potential equalization of the phases connected in the first region as explained is obtained. The one or more connecting elements couples or couple the connected tube sections in particular in a fluid-collecting and non-fluid-distributing manner, in contrast to a collector known from the prior art and arranged outside the reactor. The potential equalization within the reactor vessel proposed in the development of the invention just explained has the advantage of an almost complete freedom of potential or a significantly reduced current feedback via a neutral conductor. The result is minimal current dissipation via the header connections to other parts of the process system and a high level of shock protection. In contrast to a guidance of the reaction tubes through the wall of the reactor vessel, which is required for potential equalization outside the reactor vessel, the advantage of the spatially very homogeneous external thermal boundary conditions also results in this context in the process-related advantages already explained above.

By means of a corresponding realization of a star circuit in combination with the explained power input via longitudinally guided power input elements, a construction is created overall, which construction enables efficient energization with simultaneous stable fastening, which withstands the stresses resulting primarily from the high thermal expansion rates.

The invention will be described below first with reference to reaction tubes and reactors as used for steam cracking. However, as explained afterwards, the invention can also be used in other types of reactors, as subsequently mentioned. In general, as mentioned, the reactor proposed according to the invention can be used for carrying out any endothermic chemical reaction.

Reaction tubes, as are typically used for steam cracking, typically have at least one U-bend. For example, these can be so-called 2-passage coils. These have two tube sections in the reactor vessel, which pass into one another via (exactly) one U-bend and therefore basically have the shape of an (elongated) U. The sections entering and exiting the reactor vessel, which in particular pass seamlessly or without a flow-relevant transition into the heated tube sections, are here referred to (also with reference to the reaction tubes described below) as "feed section" and "extraction section". There is always a plurality of such reaction tubes present.

In this development, the reactor can therefore be designed in such a way that the tube sections each comprise two tube sections of a plurality of reaction tubes which are arranged at least partially side by side in the reactor vessel, the two tube sections of the multiple reaction tubes in each case passing into each other in the first region in each case via a U-bend. In particular, as mentioned, one of the respectively two tube sections in the second region is connected to a feed section and the others of the respectively two tube sections in the second region is connected to an extraction section.

In this case, the one or more contact passages in the power input arrangements can comprise or represent the U-bends. Since a plurality of reaction tubes with U-bends are present, a plurality of U-bends can also be provided in each case in the respective power input arrangements with a corresponding number and in this way be connected to a power connection. In this way, the mechanical fastening can be improved and the number of components can be reduced. Alternatively, however, it is also possible, namely even when a plurality of U-bends are energized via one power connection, to provide a respective power input arrangement per U-bend, for example in order to ensure individual longitudinal mobility of the power input elements with possibly different thermal expansion.

The development of the invention just explained can also be transferred to cases in which reaction tubes having two feed sections and one extraction section are used. In such reaction tubes, the two feed sections are in each case connected to one tube section. The extraction section is also connected to a tube section. In a typically Y-shaped connection region, the tube sections connected to the feed sections transition into the tube section connected to the extraction section. Not only the tube sections connected to the feed sections, but also the tube section connected to the extraction section, can each have one or more U-bends or none at all.

For example, reaction tubes as illustrated in FIG. 8C can be used. In these, the tube sections connected to the feed sections have no U-bend, whereas the tube section connected to the extraction section has a U-bend.

However, reaction tubes as illustrated in FIG. 8B may also be used. In these, the tube sections connected to the feed sections each have a U-bend and the tube section connected to the extraction section has two U-bends.

Even the use of reaction tubes as illustrated in FIG. 8A is possible. In these, the tube sections connected to the feed sections each have three U-bends and the tube section connected to the extraction section has two U-bends.

In addition to the development described above with reference to 2-passage coils, however, a development suitable for use with so-called 4-passage coils can also be used. These have four essentially straight tube sections. However, arrangements with a higher, even number of straight tube sections are also possible.

In more general terms, a correspondingly designed reactor comprises one or more reaction tubes, each of which has an even number of four or more tube sections connected in series with one another via a number of U-bends, the number of U-bends being one less than the number of tube sections connected in series with one another via the U-bends, and wherein the U-bends are arranged alternately in the first and the second regions starting with a first U-bend in the first region.

A "U-bend" is understood here in particular to mean a tube section or pipe component which comprises a part-circular or part-elliptical, in particular a semicircular or semi-elliptical pipe bend. The beginning and end have cut surfaces lying next to one another in particular in one plane.

Each of the U-bends, provided it is located in the first region within the reactor vessel and is to be energized accordingly, can be formed in the form of a contact passage in a power input arrangement according to the invention or represent a part of such a contact passage. Accordingly, the connected power input elements project into the connection chamber.

As mentioned, a corresponding reactor can be designed in particular as a reactor for steam cracking, that is in particular by the choice of temperature-resistant materials and the geometric configuration of the reaction tubes.

Reaction tubes, as are typically used for steam reforming, typically have no U-bends within the reactor vessel. In this case, however, the tube sections each comprise a tube section consisting of a plurality of reaction tubes, wherein the tube sections within the reactor vessel are arranged in a fluidically unconnected manner and at least in part next to one another and in each case are connected to a feed section for fluid in the first region and to an extraction section for fluid in the second region. The feed and extraction sections for fluid extend in particular in the same direction as the tube sections or do not cause fluid flow to be deflected by more than 15° in comparison to the fluid flow in the tube sections connected thereto. The feed sections and extraction sections are in particular likewise formed integrally with these, i.e. in particular in the form of the same tube. For steam reforming, the reaction tubes can, in particular, also be equipped with a suitable catalyst.

In this development, the contact passages in a power input arrangement according to the invention represent straight tube sections or channels. In this case, the power input element can be attached to the reaction tubes in the second region in particular in the manner of a sleeve.

In all cases, by forming the power input elements and the contact passages as well as optionally also the tube sections from as few individual parts as possible, the number of metal-to-metal connections (e.g., welded or soldered connections) can be reduced or even completely dispensed with. Mechanical stability and reliability can thereby be increased. In a particularly advantageous embodiment, the power input elements and the contact passages can be implemented in each case as a single cast part, or, as mentioned, parts of the process-conducting pipelines can be cast around and/or parts of the process-conducting pipelines can be formed as an integral component of a corresponding cast piece.

Metal-to-metal connections or metal transitions, which can be reduced within the scope of the invention, could lead to a local change in electrical resistance, and therefore to hot spots. Hot spots in turn lead to a reduction in service life due to elevated local temperatures or to mechanical stress peaks due to steep local temperature gradients. This is avoided within the scope of the invention.

A one-piece formation of as many components as possible provides mechanical stability, reliability and the reduction of the individual components. A high mechanical stability is desirable, since failure, as mentioned, can lead to safety-critical situations. By means of the described embodiment in the sense of the invention, the principle of reaction tubes resistively heated with polyphase alternating current in a star circuit is technically realizable in the high-temperature range, i.e. in particular at more than 500° C., more than 600° C., more than 700° C. or more than 800° C.

The invention also relates to a method for carrying out a chemical reaction using a reactor having a reactor vessel and one or more reaction tubes, wherein power input elements are guided into the reactor vessel for the electrical heating of the one or more reaction tubes.

According to the invention, a reactor is used, with which the power input elements each have a rod-shaped section and the rod-shaped sections run through a wall of the reactor vessel at a respective wall passage. A connection chamber, into which the rod-shaped sections project, is arranged outside the reactor vessel and adjacently to the wall of the reactor vessel through which the rod-shaped sections run at their wall passages. Cooling panels through which a cooling fluid can flow are provided in the connection chamber and are arranged between at least two or between at least two groups of the rod-shaped sections that project into the connection chamber.

In a particularly preferred development of the invention, a reactor is used, with which a number of tube sections of the one or more tube sections run in each case between a first region and a second region in the reactor vessel, and wherein the first regions for heating the tube sections are each electrically connected to one or more power connections of a current source.

In this development, a reactor is used, which in the first region has power input arrangements, to which a respective one or a respective group of the tube sections is electrically connected, and which each have one of the power input elements with the rod-shaped section(s) that each run at wall passages through a wall of the reactor vessel. A connection chamber, into which the rod-shaped sections project, is arranged outside the reactor vessel and adjacently to the wall of the reactor vessel through which the rod-shaped sections run at their wall passages. Cooling panels through which a cooling fluid can flow are provided in the connection chamber and are arranged between at least two or between at least two groups of the rod-shaped sections that project into the connection chamber.

For further features and advantages of a corresponding method, in which a reactor according to one of the previously explained developments of the invention is advantageously used, reference is made to the above explanations.

The invention will be further elucidated below with reference to the accompanying drawings, which illustrate developments of the invention with reference to and in comparison with the prior art.

In the following description of the figures, elements that correspond to one another functionally or structurally are indicated by identical reference symbols and for the sake of clarity are not repeatedly explained. If components of devices are explained below, the corresponding explanations will in each case also relate to the methods carried out therewith and vice versa. The description of the figures repeatedly refers to alternating current heating. As mentioned, however, the invention is also suitable in the same way for the use of direct current for heating. Reference is made here to the above explanations.

FIG. 1 schematically illustrates a reactor for carrying out a chemical reaction according to a non-inventive development.

Figure 2:
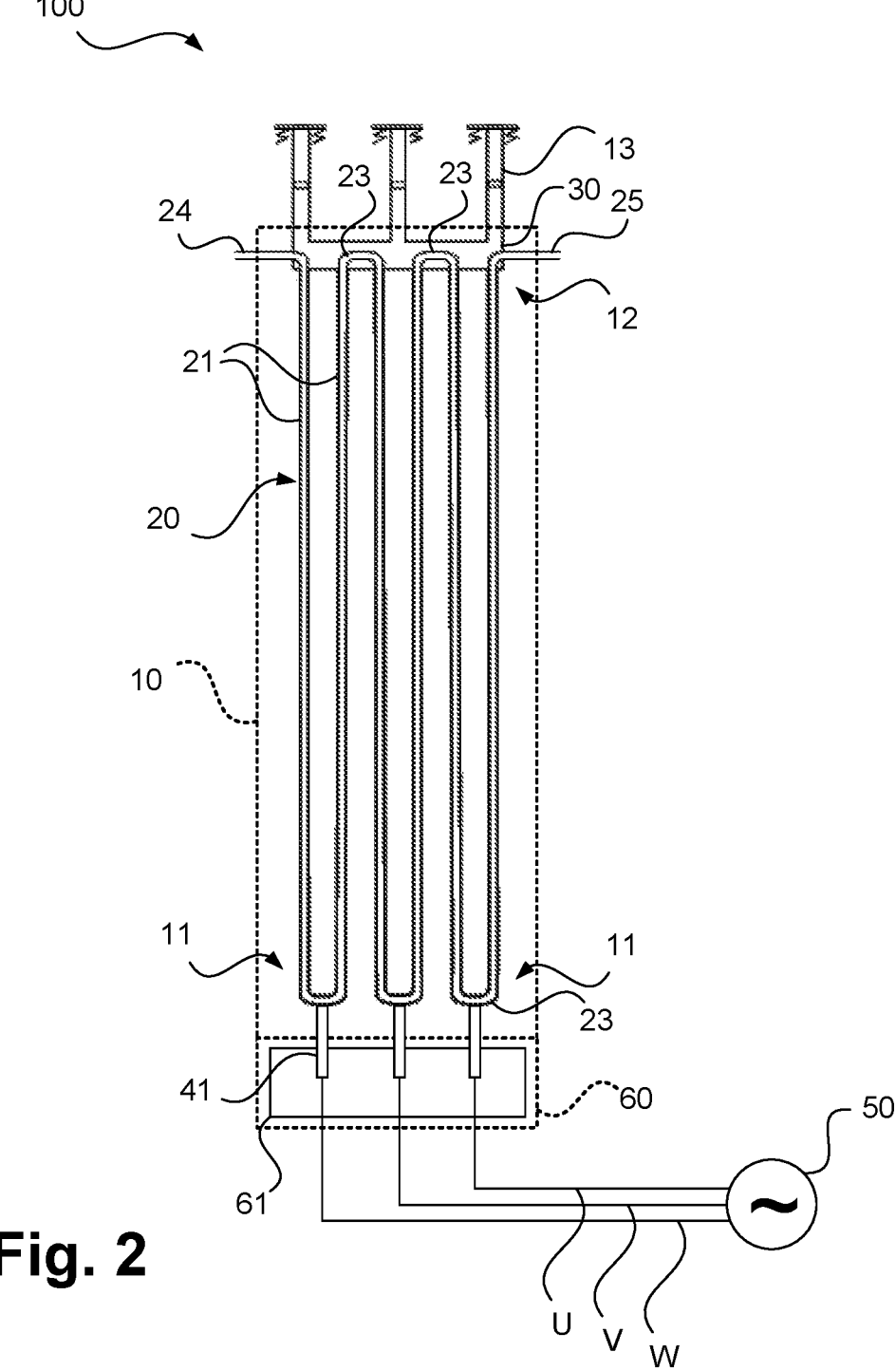
FIG. 2 schematically illustrates a reactor for carrying out a chemical reaction according to a development of the invention.

The reactor here designated 300 is set up to carry out a chemical reaction. For this purpose, it has in particular a thermally insulated reactor vessel 10 and a reaction tube 20, wherein a number of tube sections of the reaction tube 20, which are designated here by 21 only in two cases, run respectively between a first zone 11' and a second zone 12' in the reactor vessel 10. The reaction tube 20, which will be explained in more detail below with reference to FIG. 2, is attached to a ceiling of the reactor vessel or to a support structure by means of suitable suspensions 13. In a lower region, the reactor vessel can in particular have a furnace (not illustrated). It goes without saying that a plurality of reaction tubes can be provided in each case here and subsequently.

FIG. 2 schematically illustrates a reactor for carrying out a chemical reaction according to a development of the invention, which is overall designated by 100.

The zones previously designated by 11' and 12' here take the form of regions 11 and 12, wherein the tube sections 21 for heating the tube sections 21 in the first regions 11 can in each case be electrically connected to the phase connections U, V, W of a polyphase alternating current source 50. Switches and the like as well as the specific type of connection are not illustrated.

In the development of the invention illustrated here, the tube sections 21 are electrically conductively connected to one another in the second regions 12 by means of a connecting element 30 which is integrally connected to the one or more reaction tubes 20 and is arranged within the reactor vessel 10. A neutral conductor can also be connected thereto.

In the reactor 100 illustrated here, a plurality of tube sections 21 of a reaction tube 20 (although a plurality of such reaction tubes 20 may be provided) are thus arranged side by side in the reactor vessel 10. The tube sections 21 pass into one another via U-bends 23 (only partially designated) and are connected to a feed section 24 and an extraction section 25.

A first group of the U-bends 23 (at the bottom in the drawing) is arranged side by side in the first region 11 and a second group of the U-bends 23 (at the top in the drawing) is arranged side by side in the second region 12. The U-bends 23 of the second group are formed in the connecting element 30, and the tube sections 21 extend from the connecting element 30 in the second region 12 to the first region 11.

Within the scope of the invention, the use of the connecting element 30 is optional, albeit advantageous. On the other hand, developments of the invention, which are explained below, relate in particular to the development of the means for power input in the first region 11. The latter takes place by the use of power input elements 41, which are illustrated here in a highly simplified manner and of which only one is designated. These are part of power input arrangements, as explained in particular with reference to FIG. 4, and project into a cooling chamber 60, which is explained in more detail in particular with reference to FIGS. 5A and 5B, with cooling panels 61.

Figure 3:
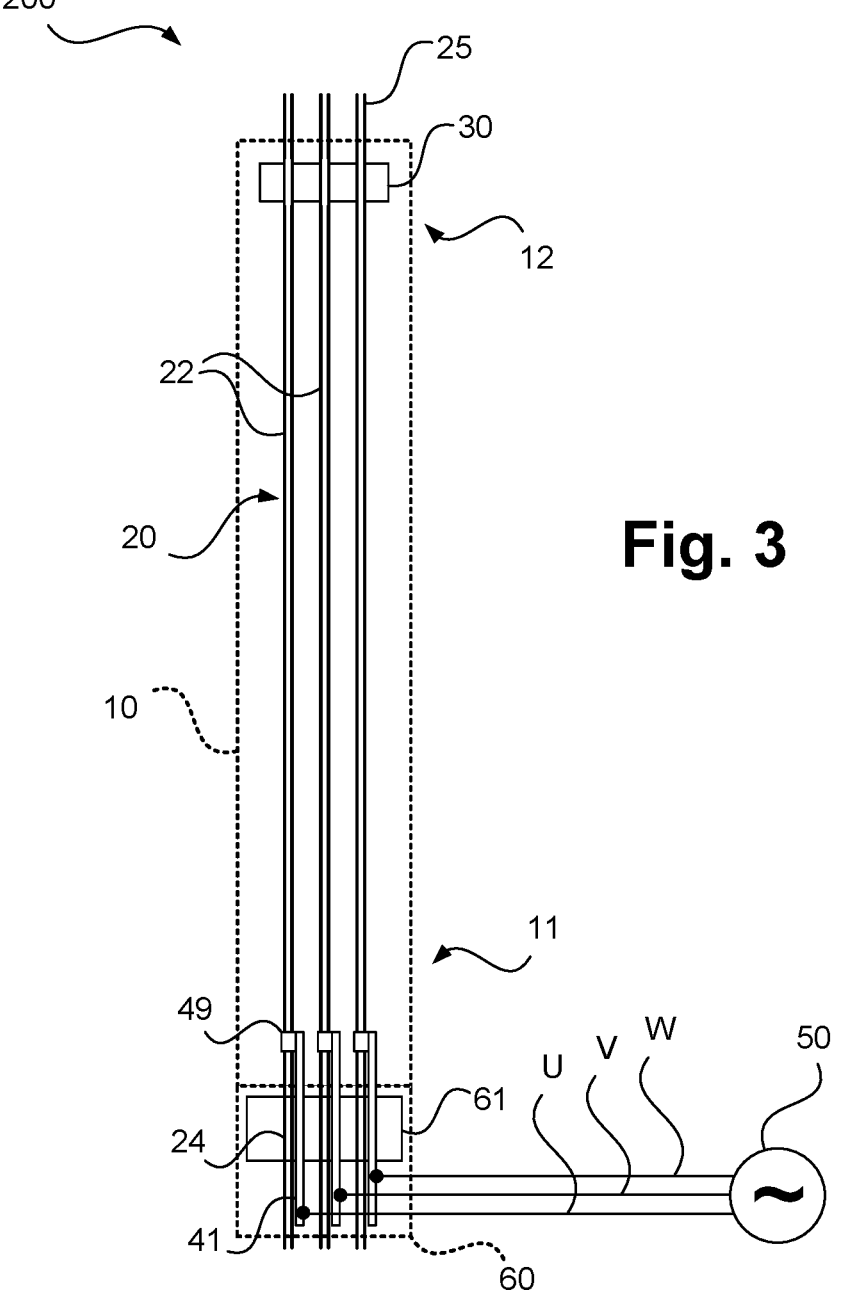
FIG. 3 schematically illustrates a reactor for carrying out a chemical reaction according to a further development of the invention.

FIG. 3 schematically illustrates a reactor for carrying out a chemical reaction according to a development of the invention, which reactor is overall designated by 200.

In the reactor 200, the tube sections—here in contrast designated by 22—in each case comprise a tube section 22 consisting of a plurality of reaction tubes 20, wherein the tube sections 22 are arranged side by side in the reactor vessel 10 in a fluidically unconnected manner and are in each case connected to feed sections 24 and extraction sections 25. For the remaining elements, reference is expressly made to the above explanations relating to the preceding figures.

Again, the use of a connecting element 30 within the scope of the invention is optional, albeit advantageous. Here as well, power input elements 41, the connection chamber 60 and a cooling panel 61 are illustrated in a greatly simplified manner. The power input elements can have a sleeve-like region 49, which are placed in the first region 11 around the reaction tubes 20 or the tube sections.

Figure 4:
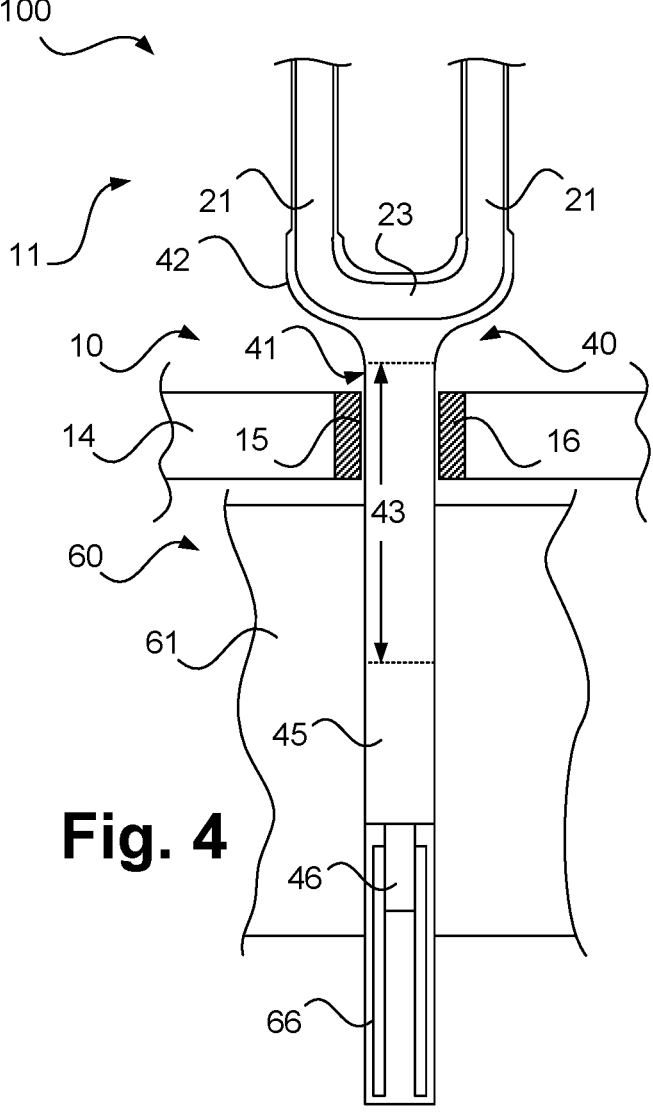
FIG. 4 schematically illustrates a reactor with a power input arrangement according to a development of the invention.

FIG. 4 shows a detail view of the first region 11 of a reactor 100, for example according to FIG. 2, with a power input arrangement 40 arranged in the first region 11 and a reaction tube 20 connected thereto, the tube sections 21 of which, illustrated in sections here, transition into one another via a U-bend 23.

The U-bend 23 is formed here in a contact passage 42 with a reinforced wall, which adjoins the two tube sections 21 in the first region 11. A wall of the contact passage 42, and thus of the U-bend 23, is connected to the already mentioned power input element designated as a whole by 41, which, as indicated here between dashed lines, has a rod-shaped section 43, which runs in each case at a wall passage 15 through a wall 14 of the reactor vessel 10. The wall passage 15 is shown in an exaggerated width here. The rod-shaped section is received longitudinally movably in the wall passage 15 and is, for example, lined with an insulating material 16.

Figure 5A:
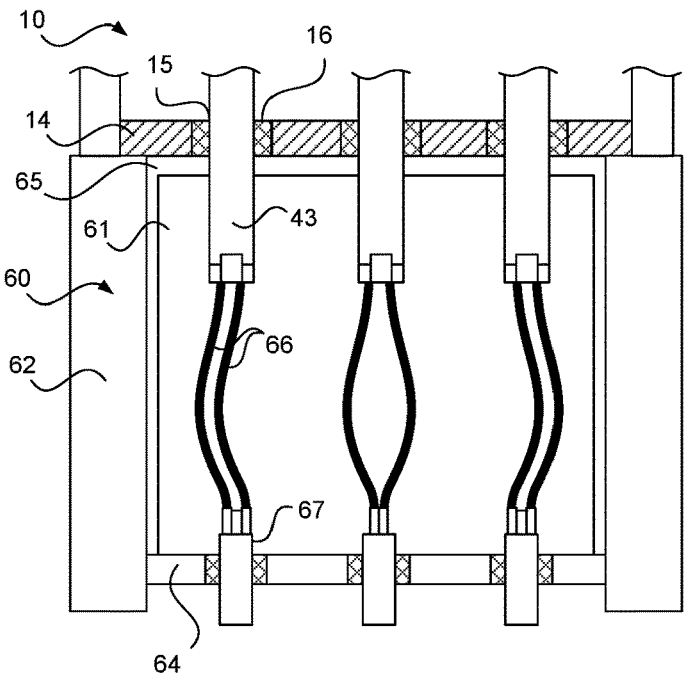
FIGS. 5A and 5B show partial views of reactors with connection chambers according to developments of the invention in a longitudinal section and a cross-section.
Figure 5B:
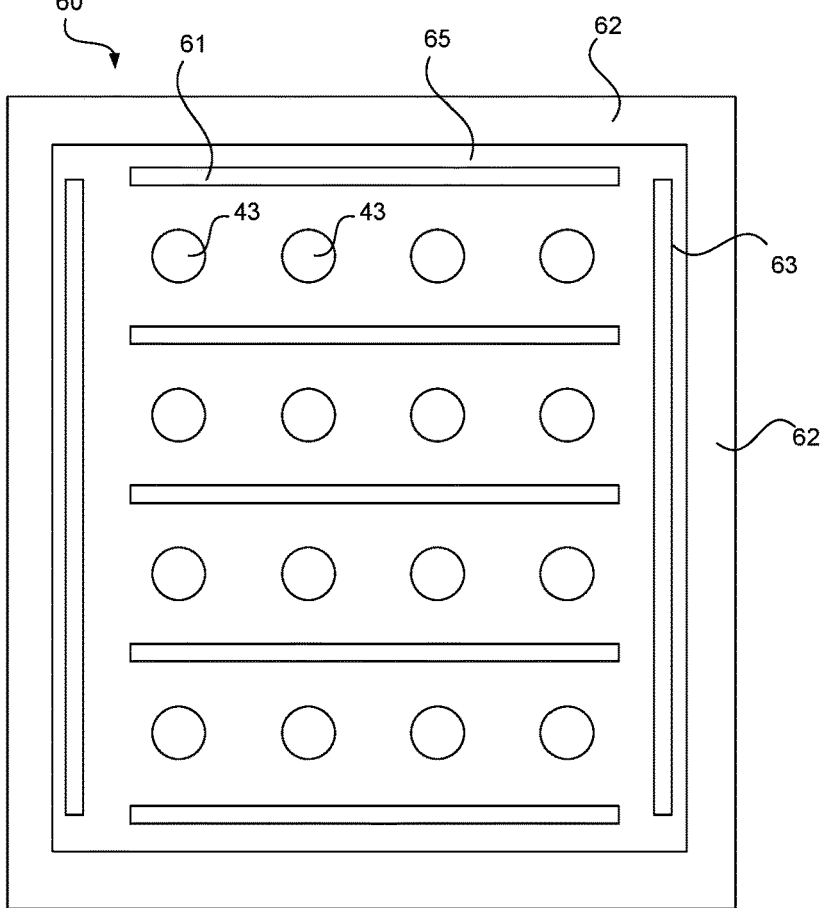

On the outside of the wall 14 of the reactor vessel 10 or adjacently thereto, the mentioned connection chamber 60 is arranged with the cooling panel 61, which is explained further with reference to FIGS. 5A and 5B.

In the example shown, the rod-shaped section 43 is adjoined by a further rod-shaped section 45, the temperature of which decreases increasingly with increasing distance to the reactor vessel 10, in particular due to the cooling by means of the cooling panel 61. The further rod-shaped section transitions into a power input pin 46, to which two connecting elements 66, for example in the form of strands, for connecting the phases U, V, W are attached.

FIGS. 5A and 5B show partial views of reactors 100 with connection chambers 60 according to developments of the invention in a longitudinal section (FIG. 5A) and a cross-section (FIG. 5B), wherein in the cross-section (FIG. 5B), only a few selected elements are illustrated and the number of elements shown corresponds only partially to one another for reasons of illustration of the more general applicability. FIGS. 5A and 5B are in particular greatly simplified insofar as a significantly larger number of elements illustrated in each case here can be provided in real reactors.

As can be seen in particular in FIG. 5A, the rod-shaped sections 43 of the power input elements each run at the wall passages 15 through the wall 14 of the reactor vessel 10. The connection chamber 60, into which the rod-shaped sections 43 project, is arranged outside the reactor vessel 10 and adjacently to the wall 14 of the reactor vessel 10 through which the rod-shaped sections 43 run at their wall passages 15.

Cooling panels 61 are provided in the connection chamber 60 and are arranged as can be seen in particular in FIG. 5B. A cooling fluid can flow through them and they are arranged between at least two or between at least two groups of the rod-shaped sections 43 that project into the connection chamber 60.

The connection chamber 60 has side walls 62 that extend in each case perpendicularly to the wall 14 of the reactor vessel 10 through which the rod-shaped sections 43 run, wherein, as can be seen in FIG. 5B and as not separately shown in FIG. 5A, one or more further cooling panels 63 can also be arranged on at least one of the side walls 62.

The connection chamber 60 has a parallel wall 64 that is shown in FIG. 5A and extends in parallel to the wall 14 of the reactor vessel 10 through which the rod-shaped sections 43 run, wherein the parallel wall 64 is formed at least in one section as a hollow wall and is likewise configured for a cooling fluid to flow through. The connection chamber 60 is designed without devices for providing forced convection in a gas atmosphere 65 surrounding the cooling panels 61 and the rod-shaped sections 43.

In the connection chamber 60, flexible connecting elements illustrated as strands 66 in FIG. 5A are connected to the rod-shaped sections 43 and are fastened with an end that is not connected to the rod-shaped sections 43 to rigid contact elements 67 that are arranged immovably in the connection chamber 60 and fastened here in insulating receptacles in the bottom 64 (without more detailed designation).

In cracker furnaces, in addition to the reaction tubes 20 previously shown in FIGS. 1 and 2, which are commonly referred to as 6-passage coils, and the six straight tube sections 21 having two 180° bends, i.e., U-bends 23, above or in the second region 12, and three 180° bends, i.e., U-bends 23, below or in the first region 11 (the latter with corresponding power input arrangements), variants with fewer passages can also be used. For example, so-called 2-passage coils have only two straight tube sections 21 and only one 180° bend or U-bend 23. Transferred to electrical heating, this variant can be regarded as a combination of 6-passage cracker furnaces (FIGS. 1 and 2) and reforming furnaces (FIG. 3, with reaction tubes without U-bends 23):

The power input can take place in each case at one point per reaction tube 21 at the lower (or only) U-bend. In each case, M reaction tubes can be electrically coupled to one another, with a phase shift of 360°/M and with a common connecting element 30. In a first alternative, a particularly large connecting element 30 can be used per coil package or for all reaction tubes 20 considered in each case. In a second alternative, however, the use of two smaller-sized connecting elements 30 is also possible.

Figures 6A, 6B, 6C, 7A, 7B:
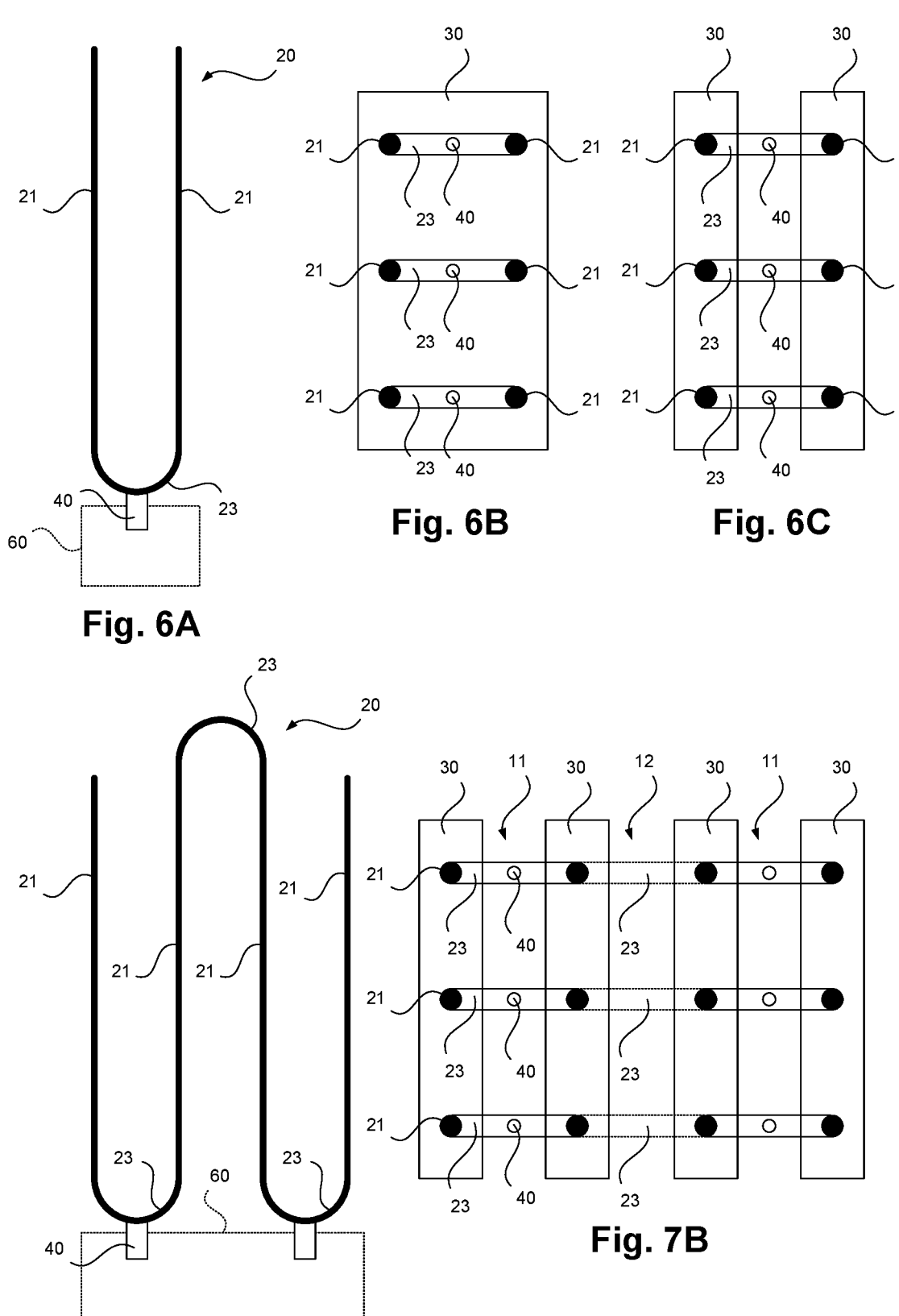
FIGS. 6A to 6C illustrate reaction tubes and corresponding arrangements for use in a reactor according to a development of the invention.
FIGS. 7A and 7B illustrate reaction tubes and corresponding arrangements for use in a reactor according to a development of the invention.

The first alternative just explained is illustrated in FIG. 6B, the second alternative just explained is illustrated in FIG. 6C in a cross-sectional view through the tube sections 21, wherein a corresponding reaction tube 20 is shown in FIG. 6A in a view perpendicular to the views of FIGS. 6B and 6C. Reference is made to FIG. 1 for the designation of the corresponding elements. It goes without saying that the connecting element(s) 30 with the U-bends 23 possibly arranged there, on the one hand, and the other U-bends 23 with the connections to the phases U, V, W via the power input arrangements 40 (shown here in a very simplified manner), on the other hand, are arranged in different planes corresponding to the first and second regions 11, 12 of a reactor. Again, it should be emphasized that the presence and arrangement of the connecting elements 30 within the scope of the invention is purely optional or arbitrary.

This concept can also be applied correspondingly to coils or reaction tubes 20 having four passages or tube sections 21 (so-called 4-passage coils), in this case with one, two or four star bridges or connecting elements 30. A corresponding example is shown in FIGS. 7A and 7B, four connecting elements 3 being shown in FIG. 6B. For improved illustration, the U-bends 23 are shown here by dashed lines (U-bends in the second region 12 of the reactor) and by unbroken lines (U-bends in the first region 11). For the sake of clarity, the elements are only partially provided with reference numerals.

The connection chambers 60 in the developments illustrated in FIGS. 6A to 6C and 7A along with 7B are designed, as explained in principle, and are therefore only illustrated in highly schematic form here.

Reference has already been made to FIGS. 8A to 8C, which illustrate further reaction tubes for use in a reactor according to a development of the invention. The reaction tubes and tube sections are here only in some cases provided with reference numerals. Feed and extraction sections may be deduced from the flow arrows shown. The power input arrangements 40 or connection chambers 60, which can be designed in particular in the manner explained above, are indicated in a highly simplified manner by dashed lines.

Figure 9:
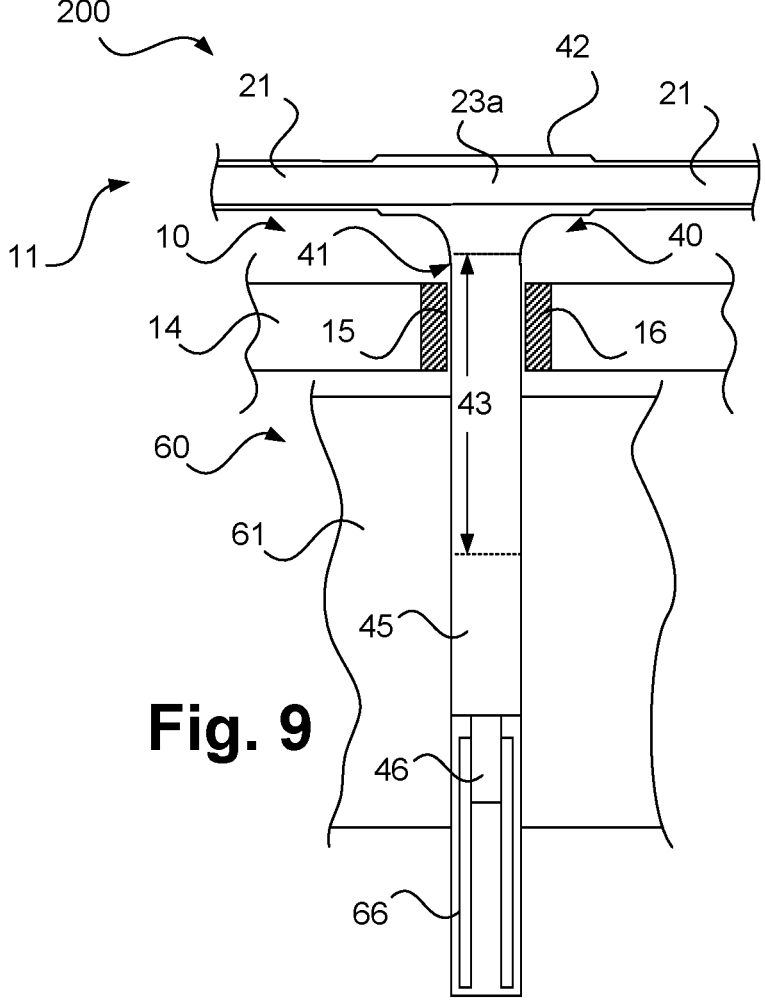
FIG. 9 schematically illustrates a reactor with a power input arrangement according to a development of the invention.

FIG. 9 shows a detail view of the first region 11 of a reactor 200, wherein the elements shown in each case already have been explained in connection with FIG. 4. In contrast to FIG. 4, however, the reaction tube 20 has no U-bend here and the tube sections 21 are arranged along a common central axis. A non-curved transition region is designated by 23a. A corresponding development can be used instead of a sleeve, for example, in the reactor 200 according to FIG. 3. The arrangement can in particular also be arranged on a side wall of the reactor 200 and is in this case rotated by 90° in comparison to FIG. 9.

Here as well, the transition region 23a is formed in a contact passage 42 with a reinforced wall, which adjoins the two tube sections 21 in the first region 11. For further explanations, reference is made to FIG. 4. The wall passage 15 is also shown in an exaggerated width here. Here as well, the rod-shaped section is received longitudinally movably in the wall passage 15 and is, for example, lined with a suitable insulating material 16. In deviation from the illustration shown here, the wall passage 15 can however also be designed differently, in particular in order to create further movement possibilities. This also applies to the optional bellows arrangement 44.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. The specification shall not be restricted to the above embodiments. Any units of measurements provided herein are exemplary only and are not meant to specifically define the dimensions of the system.

The invention claimed is:

1. A reactor for carrying out a chemical reaction, the reactor comprising a reactor vessel and one or more reaction tubes;
   wherein:
   power input elements for electrical heating of the reaction tube(s) are guided into the reactor vessel;
   the power input elements each have a rod-shaped section that runs through a wall of the reactor vessel at a respective wall passage;
   a connection chamber into which the rod-shaped sections project, is located outside the reactor vessel and adjacently to the wall of the reactor vessel in which the wall passages are formed; and
   cooling panels through which a cooling fluid can flow are provided in the connection chamber and are arranged between at least two or between at least two groups of the rod-shaped sections that project into the connection chamber; and
   the reaction tube(s) is/are used as electrical resistors to generate heat.

2. The reactor according to claim 1, wherein:
   a number of tube sections of the one or more reaction tubes each run between a first region and a second region in the reactor vessel; and
   the tube sections in the first region for electrical heating of the tube sections are each electrically connected or connectable to power connections (U, V, W) of a power source, wherein power input arrangements to which a respective one or a respective group of the tube sections is electrically connected are provided in the first region, wherein the power input arrangements each have one of the power input elements with the rod-shaped sections, each of which runs at wall passages through a wall of the reactor vessel.

3. The reactor according to claim 1, wherein the cooling panels each extend between boundary surfaces, whose distance defines a thickness of the cooling panels, and along the boundary surfaces, wherein the extension of the cooling panels along the boundary surfaces is more than double, five times, ten times, or twenty times the thickness of the cooling panels.

4. The reactor according to claim 3, wherein the boundary surfaces whose distance defines a thickness of the cooling panels are planar or curved.

5. The reactor according to claim 3, wherein at least two of the cooling panels are rotated relative to one another about an axis that is parallel to a longitudinal extension direction of the rod-shaped sections and perpendicular to the wall of the reactor vessel.

6. The reactor according to claim 3, wherein the cooling panels are configured for the cooling fluid to flow through in a direction perpendicular or parallel to a longitudinal extension direction of the rod-shaped sections.

7. The reactor according to claim 3, wherein the thickness of the cooling panels is in a range of 0.5 cm to 10 cm.

8. The reactor according to claim 1, wherein the connection chamber has side walls extending perpendicularly to the wall of the reactor vessel through which the rod-shaped sections run, wherein one or more further cooling panels are arranged on at least one of the side walls.

9. The reactor according to claim 1, wherein the connection chamber has a parallel wall that extends in parallel to the wall of the reactor vessel through which the rod-shaped sections run, wherein the parallel wall is formed at least in one section as a hollow wall and is configured for the cooling fluid or a further cooling fluid to flow through.

10. The reactor according to claim 1, with which the connection chamber is designed without devices for providing forced convection in a gas atmosphere surrounding the cooling panels and the rod-shaped sections.

11. The reactor according to claim 1, with which the connection chamber is gas-tight except for the wall of the reactor vessel forming a wall of the connection chamber.

12. The reactor according to claim 1, wherein copper-containing connecting elements and/or flexible connecting elements, which are fastened with an end that is not connected to the rod-shaped sections to rigid contact elements arranged immovably in the connection chamber, are connected in the connection chamber to the rod-shaped sections.

13. The reactor according to claim 1, wherein the rod-shaped sections projecting into the connection chamber each have a cross-section there that is at least partially not less than 10 square centimeters.

14. The reactor according to claim 1, wherein the reactor is designed as a reactor for steam cracking or as a reactor for steam reforming, for dry reforming, or for catalytic dehydrogenation of alkanes.

15. The reactor according to claim 2, wherein the cooling panels each extend between boundary surfaces, whose distance defines a thickness of the cooling panels, and along the boundary surfaces, wherein the extension of the cooling panels along the boundary surfaces is more than double, five times, ten times, or twenty times the thickness of the cooling panels.

16. The reactor according to claim 3, wherein the boundary surfaces whose distance defines a thickness of the cooling panels are planar or curved.

17. The reactor according to claim 16, wherein at least two of the cooling panels are rotated relative to one another about an axis that is parallel to a longitudinal extension direction of the rod-shaped sections and perpendicular to the wall of the reactor vessel.

18. The reactor according to claim 4, wherein at least two of the cooling panels are rotated relative to one another about an axis that is parallel to a longitudinal extension direction of the rod-shaped sections and perpendicular to the wall of the reactor vessel.

19. A method for carrying out a chemical reaction, comprising:

providing and using a reactor comprising a reactor vessel and one or more reaction tubes;

wherein:

power input elements for electrical heating of the reaction tube(s) are guided into the reactor vessel;

the power input elements each have a rod-shaped section that in each case runs through a wall of the reactor vessel at a wall passage;

a connection chamber into which the rod-shaped sections project is arranged outside the reactor vessel and adjacently to the wall of the reactor vessel through which the rod-shaped sections run at their wall passages;

cooling panels through which a cooling fluid can flow are provided in the connection chamber and are arranged between at least two or between at least two groups of the rod-shaped sections that project into the connection chamber; and the reaction tube(s) is/are used as electrical resistors to generate heat.

* * * * *